INVENTOR.
JOHN W. WELCH
By MASON, KOLEHMAINEN
RATHBURN & WYSS

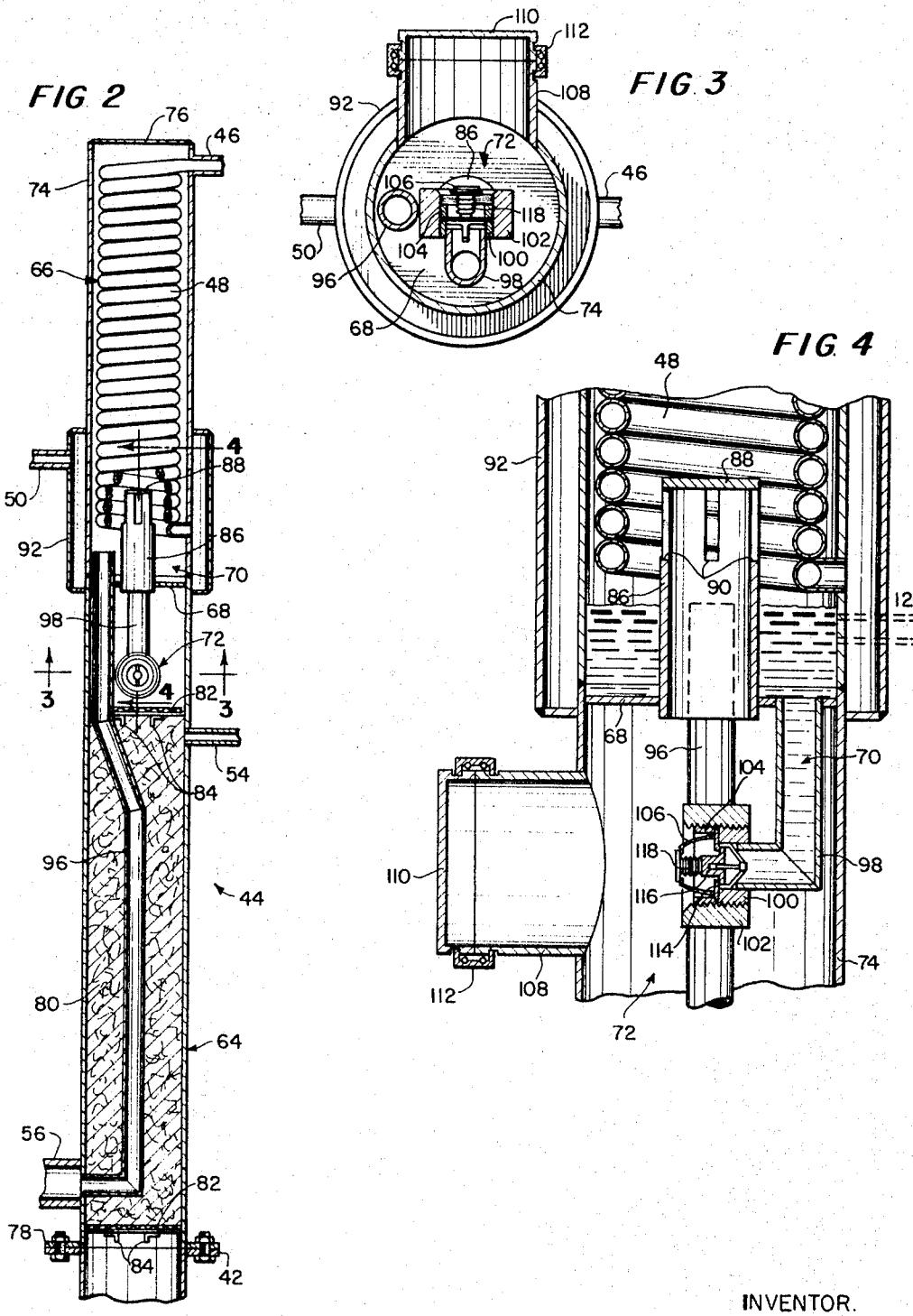

United States Patent Office 3,451,897
Patented June 24, 1969

3,451,897
APPARATUS FOR RECONCENTRATING GLYCOL AND THE LIKE
John W. Welch, Farmington, N. Mex., assignor to American Tank and Steel Corporation, Farmington, N. Mex., a corporation of New Mexico
Filed Feb. 2, 1967, Ser. No. 613,613
Int. Cl. B01d 3/42, 1/04
U.S. Cl. 202—160                                      3 Claims

ABSTRACT OF THE DISCLOSURE

A gas treatment system includes a contactor and a reconcentrator for glycol used to absorb water vapor from the gas. Wet glycol from the contactor is preheated and supplied to a still column to which heated vapors are also supplied from a reboiler. As a result of heat transfer in the still column, water vapor rises from the column and liquid glycol descends to the reboiler for reuse in the contactor. Vapors from the still column are condensed, accumulated, and readmitted to the column in liquid form under the control of a thermostatically controlled valve. The valve is controlled in accordance with the vapor temperature to maintain the still top temperature at a desired level.

---

The present invention relates to improved reconcentrator apparatus and to a method of separating water from glycol or other desiccant of the type used for the dehydration of natural gas. A primary object of the invention is the provision of novel apparatus and a method of preventing loss of the desiccant during reconcentrating.

In one widely used method of dehydrating natural gas, a stream of natural gas is placed in intimate contact with a stream of a desiccant liquid, and the moisture, or water vapor, present in the natural gas is absorbed by the desiccant. Some commonly used liquid dehydrating agents are ethylene glycol, diethylene glycol, and triethylene glycol. The term "glycol" as used herein should be taken to include these agents, as well as any other desiccants which could be used in such processes. Conventionally, a continuous process is used, and the glycol travels through a closed cycle in which the glycol first absorbs moisture from the natural gas and then is passed through a reconcentrator for removal of the moisture, whereupon the dry glycol is reused for dehydration of the gas.

Conventional glycol reconcentrating apparatus includes a reboiler containing a heated supply of glycol to be reconcentrated together with a still column receiving a flow of vapor produced by evaporation in the reboiler. The wet glycol to be reconcentrated may either be introduced into the still column or added directly to the fluid in the reboiler. A temperature gradient exists along the length of the still column, and hot vapors from the reboiler move upwardly in the column away from the reboiler, while cooler liquids move downwardly in the still column toward the reboiler. Vapors rising from the still column are transformed to the liquid state in a condenser, and part of the cooled, condensed fluid called "reflux liquid" may be readmitted to the upper portion of the still column where it moves downwardly and contacts the hot vapor rising from the reboiler. The remainder of the condensed liquid is discharged from the system.

In the still column, heat is transferred from the hot vapor to the cool reflux liquid, and since glycol has a higher boiling point than water, the glycol in the vapor is condensed and moves downwardly through the still column toward the reboiler. Conversely, the water in the reflux liquid is vaporized and moves upwardly in the still column toward the condenser. Theoretically, a near perfect separation can be accomplished in which substantially all the glycol returns to the reboiler for reuse, and substantially all the water is condensed and either discharged from the system or used for reflux liquid.

However, satisfactory operation of a conventional reconcentrator depends upon the existance of adequate amounts of water in the glycol to be reconcentrated. If there is insufficient reflux liquid, then there is not sufficient heat transfer from the vapor to the liquid phases to achieve the desired material transfer from the vapor phase to the liquid phase. As a result, substantial quantities of glycol can reach the condenser in vapor form and can be discharged from the system. Such a loss of glycol can result, for example, when an unsaturated natural gas steam is being processed, when the gas flow rate is less than that for which the system is designed, or when the reconcentrator is maintained in operative condition, but no natural gas is supplied to the system. The latter condition may occur when the well is shut, as in cold weather.

The present invention provides a novel arrangement for assuring that an adequate amount of reflux liquid is continuously supplied to the still column, thereby to avoid the loss of glycol under all operating conditions.

In brief, an embodiment of the present invention may comprise a still column, together with a reboiler for supplying a flow of vapor to the column, and a condenser for cooling and condensing the vapors which rise from the still column. In accordance with an important feature of the invention, means are provided for accumulating a supply of the condensed liquid and for returning accumulated liquid to the still column as reflux liquid under thermostatic control in accordance with the heat of the vapor leaving the still column. If the vapor temperature reaches a level at which glycol is contained in the vapor, the return of reflux liquid is increased so that the upper portion of the still column is cooled and all the glycol vapors are condensed and returned to the reboiler. Similarly, if the temperature of the vapor deacreses below the desired range, the flow of reflux liquid is reduced.

In accordance with another feature of the invention, means may be provided for adding water from an external source, such as the water recovered from a three-phase inlet separator or scrubber, to the reflux liquid accumulator. This arrangement may be desirable when the reconcentrator operates for extended periods without substantial absorbtion of water into the glycol stream from the natural gas stream.

For a better understanding of the present invention reference should be had to the following detailed description taken in conjunction with the drawings, in which:

FIG. 2 is a vertical sectional view of the reflux tower shown diagrammatically in FIG. 1;

FIG. 3 is an enlarged sectional view taken along the line 3—3 of FIG. 2; and

FIG. 4 is a greatly enlarged sectional view taken along the line 4—4 of FIG. 2.

Figure 1:
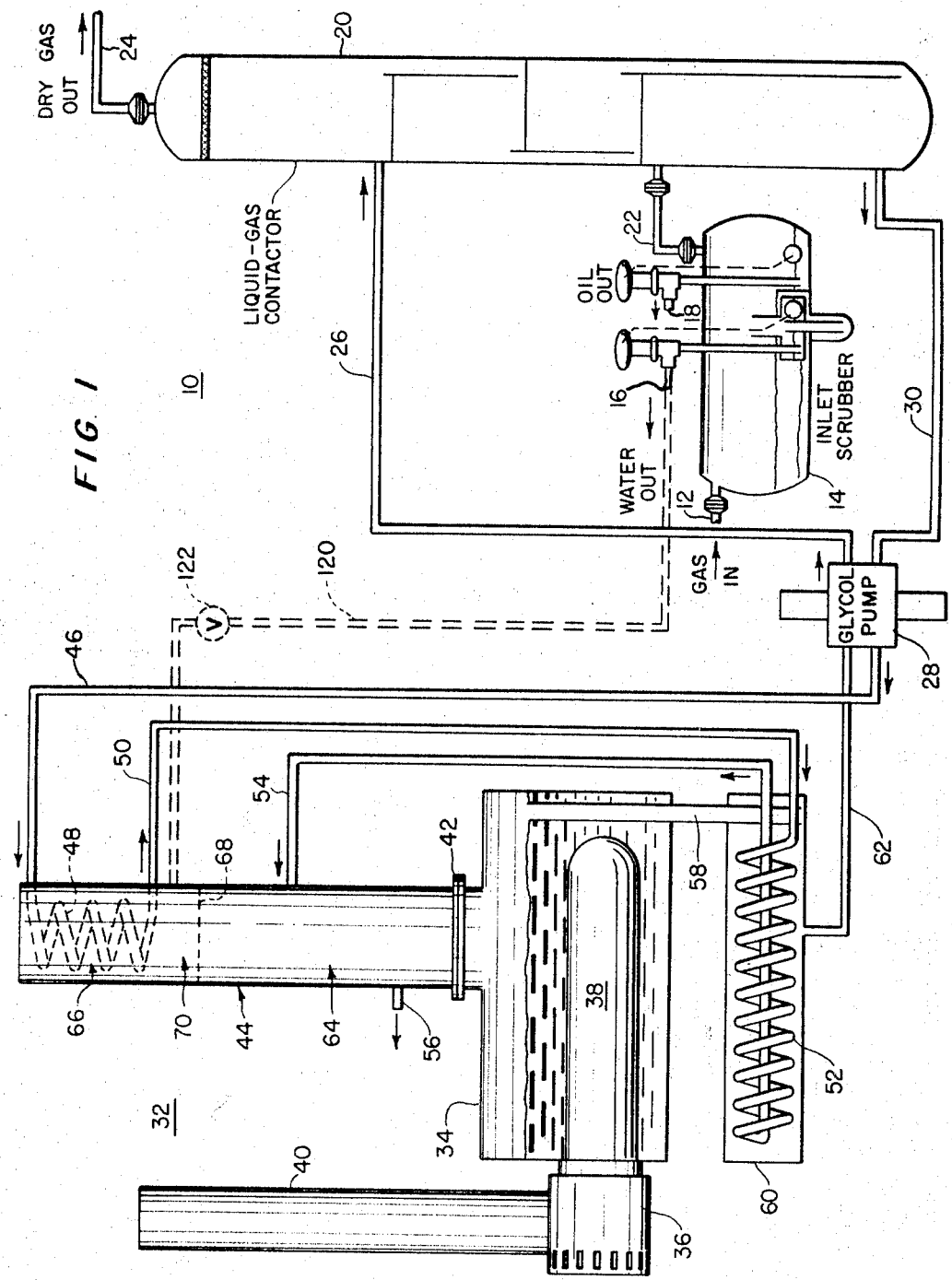
FIG. 1 is a diagrammatic representation of a gas dehydrating system including reconcentrating apparatus embodying the features of the present invention.

Referring now to the drawings and initially to FIG. 1, there is illustrated largely in diagrammatic form a gas dehydrating system designated as a whole by the reference numeral 10. Generally, the system 10 functions to separate water and the gaseous and liquid hydrocarbon components of the well stream obtained from oil-gas or natural gas wells and to supply gas to storage or a sales line. The fluids of the well stream are supplied through an inlet conduit 12 to an inlet scrubber or separator 14 in which the liquid components are separated from the gaseous components. The separator 14 may be of any known construction, and the water and liquid hydrocarbons separated from the well fluid are removed from the scrubber 14 respectively through a pair of conduits 16 and 18.

In order to remove the water vapor from the gaseous hydrocarbon flow, a liquid-gas contactor or absorber 20 receives the flow from the scrubber 14 through a conduit 22. Within the contactor 20, natural gas admitted from the conduit 22 travels upwardly and is removed through an outlet conduit 24. This stream of gas comes into intimate contact with a counterflow of glycol or other desiccant. Dry glycol, having a low moisture content, is supplied to the contactor 20 through a conduit 26 by means of a tandem glycol pump 28. The glycol moving downwardly through the contactor 20 absorbs water vapor from the natural gas flow, and the wet glycol having a high moisture content is removed from the contactor 20 through a conduit 30 by the glycol pump 28.

The system carries out a continuous process in which the glycol desiccant is reconcentrated or dehydrated after use in the contactor 20 before reuse. The glycol moves through a closed system between the contactor 20 and glycol reconcentrating apparatus indicated as a whole by the reference numeral 32.

As illustrated in FIG. 1, the glycol reconcentrator 32 includes a reboiler 34 containing a quantity of glycol which is continuously heated by means of a burner 36 communicating with a fire tube 38 immersed in the liquid within the reboiler and vented by means of a stack 40. Extending upwardly from a fitting 42 at the top of the reboiler 34 is a reflux tower generally designated as 44 which receives a flow of vapors produced by evaporation of the fluid contained within the reboiler 34.

The wet glycol from the pump 28 passes through a conduit 46 to a heat exchange coil 48 located at the top of the reflux tower. The wet glycol is heated in the coil 48, and this coil also serves as a condenser for vapors within the reflux tower 44. The wet glycol leaving the coil 48 passes through a conduit 50 to another heat exchange coil 52 wherein the wet glycol is further preheated. The moisture-laden, preheated glycol is then fed into the reflux tower 44 via a conduit 54. As explained in detail hereinafter, moisture is removed from the glycol, and is discharged from the system through a discharge outlet 56, while reconcentrated, low-moisture glycol is collected within the reboiler 34. The dry glycol from the reboiler 34 is conveyed through a open-ended conduit or spill pipe 58 to a sump chamber 60 in which it is cooled by contact with the heat exchange coil 52 and then forwarded through a conduit 62, the pump 28, and the conduit 26 for use in the liquid-gas contactor 20.

The construction of the reflux tower 44 is illustrated in FIGS. 2–4. Generally, the tower 44 includes a still column designated as a whole as 64 and a condenser chamber generally designated as 66 separated from each other by a wall 68. Vapors passing through the still column 64 and reaching the condenser chamber 66 are condensed to their liquid form and flow downwardly to a reflux liquid accumulator generally designated as 70 and defined in part by the wall 68.

In accordance with an important feature of the present invention, the flow of reflux liquid from the accumulator 70 back to the still column 64 is controlled in response to temperature by means of a valve 72 (FIGS. 2–4) so that glycol vapor is prevented from escaping into the condenser chamber 66. In this manner, the loss of glycol from the system is reduced.

The reflux tower 44 includes an elongated cylindrical casing 74 housing both the still column 64 and condenser chamber 66. The casing is closed at its upper end by a plate 76 and is provided at its open lower end with a flange fitting 78 fastened to the fitting 42 of the reboiler to couple the casing 74 to the reboiler 34. Vapors rising from the reboiler 34 move upwardly within the still column 64 which is filled with a mass of packing material 80 held in position by a pair of spaced screens or grates 82 supported by angle irons 84. The packing may be of any well known material such as ceramic saddles or a plurality of plates. A vent pipe 86 open at its bottom end and closed at its top by a cap plate 88 includes a plurality of openings 90 (FIG. 4) adjacent its open end through which vapors rising from the still column 64 reach the condenser chamber 66.

The heat exchange coil 48 is located within the condenser chamber 66 and receives cool glycol flow from the contactor 20 via the conduit 46. Fluid from the coil 48 flows into a jacket enclosure 92, and then into the conduit 50. Vapors rising into the condenser chamber 66 are cooled by loss of heat to the fluid within the coil 48, and are condensed. The condenser liquid, called reflux liquid, is collected at the bottom of the condenser chamber 66 in the reflux liquid accumulator 70 (see FIG. 4). The maximum level of fluid in the reflux liquid accumulator is determined by a conduit 96 serving as a vent for non-condensible vapors reaching the condenser chamber 66, and as a weir through which excess liquid is conducted to the discharge pipe 56. The reflux liquid accumulator 70 is also comprised of a conduit 98 extending downwardly from the wall 68 and communicating with the valve 72 in the region above the still column 64.

In operation of the reflux tower 44, the preheated stream of wet glycol is fed into the still column 64 through the conduit 54, although the wet glycol could be fed directly into the reboiler 34, with or without preheating. Hot vapors from the reboiler move upwardly into and through the still column 64 and cool reflux liquid is admitted to the top of the still column, contacting the rising vapors. The wet glycol fluid, in the illustrated embodiment of the invention, initially joins the descending reflux liquid.

A temperature gradient exists along the length of the still column, with the temperature at the bottom being approximately equal to or somewhat lower than the temperature of the liquid in the reboiler, which may be in the range of 350°–375°. The still column temperature decreases toward the top of the still column. Within the still column, heat is transferred from the hot ascending vapor to the cool descending liquid. As a result, glycol in the vapor is condensed and joins the fluid moving downwardly while water in the liquid is vaporized and joins the vapors moving upwardly.

Theoretically, the vapors reaching the condenser chamber 66 should consist almost entirely of water, while substantially all of the glycol should return in liquid form to the reboiler 34 for reuse in the contactor 20. However, in known reconcentrators under some conditions glycol vapors can reach the condenser chamber and be discharged from the system in substantial quantities. This may occur, for example, when the amount of water added to the system decreases—as when an under-saturated natural gas stream is processed. Under these conditions insufficient reflux liquid is present for the desired heat transfer between the liquids and the vapors in the still column, the temperature at the top of the still column increases, and glycol vapors reach the condenser, and may be discharged from the system in fluid form.

In order to avoid undesirable loss of glycol, and in accordance with an important feature of the invention, the valve 72 is provided for admitting reflux fluid from the accumulator 70 to the still column 64 in amounts determined by the temperature of the vapors rising from the still column 64. Thus, when the temperature of the rising vapors reaches the level at which the vapors contain glycol vapors, the valve 72 opens to release reflux liquid from the accumulator 70 to cool the top of the still column. Conversely, if the vapor temperature drops below the desired level, the reflux flow is decreased to prevent an excessive load on the reboiler 34. Under any operating condition, an equilibrium condition is quickly reached and only water vapors are introduced into the condenser chamber 66.

Referring to FIGS. 3 and 4, an externally threaded annular member 100 is fixed to the lower end of the conduit 98, and a coupling 102 is threaded thereon. An externally threaded bushing 104 serves to clamp a flanged valve assembly 106 in place to control the admission of reflux liquid to the still column 64. Installation, adjustment and replacement of the valve 72 is facilitated by the provision of a short length of pipe 108 normally closed by a removable cap 110 held in place by a clamp coupling 112.

The flanged valve assembly 106 may be of any desired construction, and may conveniently comprise a fixed temperature range liquid thermostat valve of the type used in automobile engine cooling systems. Such valves are available for various temperature ranges, and may be selected, or adjusted, to maintain the desired still top temperature within the still column 64. This temperature will depend on the elevation of the installation and upon the type of glycol used. The valve 72 includes a valve seat member 114 cooperating with a valve member 116, the position of which is controlled by a vapor temperature responsive bellows 118 disposed in the path of vapors flowing upwardly to the condenser chamber 66.

Because of the provision of the reflux liquid accumulator, which collects a substantial supply of reflux liquid, the reconcentrating apparatus is able to operate for substantial periods of time without loss of glycol even if little or no water is added to the system with the glycol from the contactor 20. However, if prolonged operation of the apparatus without addition of water to the glycol stream is anticipated, it may be desirable to replenish the supply of water in the accumulator 70 from an external source such as the inlet scrubber 14, although another water supply could be used. As illustrated in dotted lines in FIGS. 1 and 4, a conduit 120 extends from the water outlet 16 of the scrubber 14 to the reflux liquid accumulator 70, and flow through the conduit 120 is controlled by a valve 122. The valve 122 may be manually operated, or may be operated automatically to add fluid to the accumulator 70 when a predetermined minimum level is reached.

While there has been illustrated and described an embodiment of the present invention, it will be appreciated that numerous changes and modifications will occur to those skilled in the art, and it is intended in the appended claims to cover all those changes and modifications which fall within the spirit and scope of the present invention.

What is claimed as new and desired to be secured by Letters Patent of the United States is:

1. Glycol reconcentrating apparatus comprising a reboiler, a reflux tower including a still column receiving vapors from the reboiler, a condenser chamber within the reflux tower, wall means in the reflux tower separating the still column and the condenser chamber, a vent in said wall means for allowing vapors from said still column to enter said condenser chamber, a reflux liquid accumulator defined in part by said wall means for collecting a supply of condensed liquid from said condesnser chamber, discharge means for removing excess liquid from the reflux liquid accumulator, conduit means extending between said reflux liquid accumulator and said still column, valve means controlling the flow of liquid from said reflux liquid accumulator through said conduit means to said still column, and temperature responsive means operatively associated with said valve means and disposed in heat sensing relationship with the vapors entering said vent for releasing a cooling flow of reflux liquid in accordance with temperature of the vapors sensed by the temperature responsive means.

2. The reconcentrating apparatus of claim 1, further comprising means for supplying additional fluid to said accumulator for maintaining a supply of fluid in the accumulator.

3. The reconcentrating apparatus of claim 1, said temperature responsive means being constructed and arranged to open said valve when the sensed vapor temperature reaches the level at which glycol vapors enter said vent.

References Cited

UNITED STATES PATENTS

| | | | |
|---|---|---|---|
| 2,428,643 | 10/1947 | Young | 55—32 |
| 2,584,211 | 2/1952 | Kraft | 203—2 |
| 3,750,331 | 6/1956 | Meyers | 159—31 X |
| 3,105,748 | 10/1963 | Stahl | 55—32 |
| 3,301,778 | 1/1967 | Cabbage | 203—2 X |
| 3,338,825 | 8/1967 | Taggart | 208—350 |
| 3,342,698 | 9/1967 | Rijnsderp | 203—2 X |
| 3,370,636 | 2/1968 | Francis et al. | 159—31 X |
| 3,050,450 | 8/1962 | Kleiss et al. | 202—160 |
| 3,071,520 | 1/1963 | Smalling | 202—160 |
| 3,158,557 | 11/1964 | Tolin | 202—160 |
| 2,994,643 | 8/1961 | Smalling | 202—160 |

FOREIGN PATENTS 1,034,586   7/1958   Germany.

OTHER REFERENCES

The Petroleum Engineer: March 1943, pp. 184, 186, Black Photostat, copy in Group 170, 55–32.

NORMAN YUDKOFF, *Primary Examiner.*

J. SOFER, *Assistant Examiner.*

U.S. Cl. X.R.

55—20, 32; 159—29, 31